US011970096B2

(12) United States Patent
Sahi et al.

(10) Patent No.: US 11,970,096 B2
(45) Date of Patent: Apr. 30, 2024

(54) VEHICLE SEATING ASSEMBLY HAVING LOCKING PIVOT MECHANISMS

(71) Applicant: Ford Global Technologies, LLC, Dearborn, MI (US)

(72) Inventors: Jaspinder S. Sahi, Novi, MI (US); Matthew T. Jensen, Canton, MI (US); Rabindranath Persad, Ann Arbor, MI (US); Christopher Rumaczyk, Royal Oak, MI (US); Kurt Leon Kormos, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 353 days.

(21) Appl. No.: 17/572,756

(22) Filed: Jan. 11, 2022

(65) Prior Publication Data

US 2023/0219467 A1 Jul. 13, 2023

(51) Int. Cl.
*B60N 2/30* (2006.01)
*B60N 2/10* (2006.01)

(52) U.S. Cl.
CPC .............. *B60N 2/3011* (2013.01); *B60N 2/10* (2013.01); *B60N 2/305* (2013.01); *B60N 2205/35* (2013.01)

(58) Field of Classification Search
CPC .. B60N 2205/35; B60N 2/3011; B60N 2/305; B60N 2/10
USPC ........................................................ 297/378.1
See application file for complete search history.

(56) References Cited

U.S. PATENT DOCUMENTS

| 7,252,320 | B2 | 8/2007 | Tsujibayashi et al. |
| 7,717,489 | B2 | 5/2010 | Mitsuhashi |
| 8,177,281 | B2 | 5/2012 | Sayama |
| 10,525,853 | B2 | 1/2020 | Kubota et al. |
| 10,675,996 | B2 | 6/2020 | Hoyer et al. |
| 11,124,093 | B2 | 9/2021 | Schmitz et al. |
| 2005/0168035 | A1* | 8/2005 | Boudinot ............. B60N 2/3013 297/378.1 |
| 2006/0033372 | A1* | 2/2006 | Lee ...................... B60N 2/3009 297/378.1 |
| 2010/0026073 | A1* | 2/2010 | Bruck ...................... B60N 2/20 297/378.1 |

FOREIGN PATENT DOCUMENTS

DE 10345650 B4 * 1/2010 ............... B60N 2/22

* cited by examiner

*Primary Examiner* — Milton Nelson, Jr.
(74) *Attorney, Agent, or Firm* — Vichit Chea; Price Heneveld LLP (57) ABSTRACT

A vehicle seating assembly includes a seat base, a split seatback having a seatback frame and pivotally coupled to the seat base, the split seatback having a first seatback and a second seatback, a first pivot mechanism coupled to the seatback frame allowing the split seatback to pivot between an upright position and a folded position, and a motor for moving the split seatback to pivot to the folded position. The assembly also includes a second pivot mechanism comprising a pair of locking pivot mechanisms coupled to the second seatback for releasably holding the second seatback in an upright position, a dump spring operatively coupled to the second seatback to spring bias the second seatback towards the folded position, and a second mechanism comprising a pull mechanism for releasing the second pair of pivot mechanisms to allow the second seatback to move to the folded position.

18 Claims, 8 Drawing Sheets

VEHICLE SEATING ASSEMBLY HAVING LOCKING PIVOT MECHANISMS

FIELD OF THE DISCLOSURE

The present disclosure generally relates to vehicle seating, and more particularly relates to a split back seat assembly having an independently foldable seatback.

BACKGROUND OF THE DISCLOSURE

Automotive vehicles are commonly equipped with vehicle seating that includes a bench or split bench seating assembly with a foldable seatback to allow for objects to pass through. Typically folding split bench seats include striker and latch assemblies. It may be desirable to provide for a vehicle seating assembly that allows for folding of a seatback absent exposed connector elements.

SUMMARY OF THE DISCLOSURE

According to a first aspect of the present disclosure, a vehicle seating assembly is provided. The vehicle seating assembly includes a seat base, a split seatback having a seatback frame and pivotally coupled to the seat base, the split seatback having a first seatback and a second seatback, and a first pivot mechanism coupled to the seatback frame for allowing the split seatback to pivot between an upright position and folded position. The vehicle seating assembly also includes a first mechanism for moving the split seatback to the folded position, a second pivot mechanism coupled to the second seatback and comprising a pair of locking pivot mechanisms for releasably holding the second seatback in an upright position, and a second mechanism for releasing the pair of locking pivot mechanisms to allow the second seatback to move to a folded position.

Embodiments of the first aspect of the disclosure can include any one or a combination of the following features:
- a first spring operatively coupled to the second pivot mechanism to spring bias the second seatback towards the folded position;
- the spring comprises a dump spring;
- the first mechanism comprises a motor actuatable to move split seatback toward the folded position;
- the second mechanism comprises a release mechanism;
- the release mechanism comprises a pull strap;
- the pull strap is located proximate an upper side of the second seatback;
- the second seatback is free of a striker or latch;
- the vehicle seating assembly comprises a rear seating assembly;
- the second pivot mechanism comprising a pivot rod extending laterally across the second seatback; and
- the pair of locking pivot mechanisms are located proximate opposite ends of the pivot rod.

According to a second aspect of the present disclosure, a vehicle seating assembly is provided. The vehicle seating assembly includes a seat base, a split seatback having a seatback frame and pivotally coupled to the seat base, the split seatback having a first seatback and a second seatback, a first pivot mechanism coupled to the seatback frame allowing the split seatback to pivot between an upright position and a folded position, and a motor for moving the split seatback to pivot to the folded position. The vehicle seating assembly also includes a second pivot mechanism comprising a pair of locking pivot mechanisms coupled to the second seatback for releasably holding the second seatback in an upright position, a dump spring operatively coupled to the second seatback to spring bias the second seatback towards the folded position, and a second mechanism comprising a pull mechanism for releasing the second pair of pivot mechanisms to allow the second seatback to move to a folded position with the dump spring.

Embodiments of the second aspect of the disclosure can include any one or a combination of the following features:
- the second pivot mechanism comprising a pivot rod extending laterally across the second seatback;
- the pair of locking pivot mechanisms are located proximate opposite ends of the pivot rod;
- the first mechanism comprises a motor actuatable to move the split seatback toward the folded position;
- the release mechanism comprises a first pull strap;
- the pull strap is located proximate an upper side of the second seatback;
- the second seatback is free of a striker or latch; and
- the vehicle seating assembly comprises a rear seating assembly.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
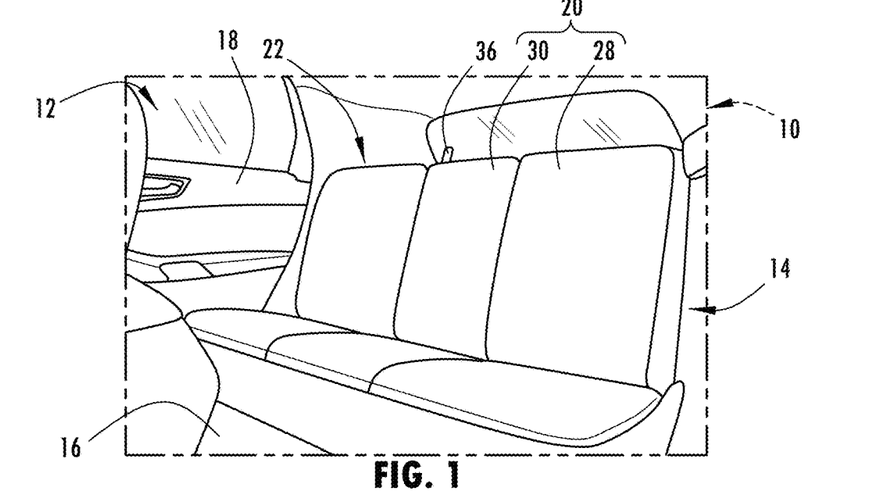
FIG. 1 is a perspective view of the cabin interior of a vehicle having a row of seating with a vehicle seating assembly.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a vehicle 10 is generally illustrated having a cabin interior 12, according to one example. The vehicle 10 may include a motor vehicle, such as a wheeled motor vehicle in the form of a sedan, truck, sport utility vehicle (SUV), bus and may include other vehicles having a row of seating for transporting passengers. The cabin interior 12 includes a row of seating 14 which may be a second or third row of seating, according to one example. However, it should be appreciated that the row of seating 14 may be a first row or may be greater than a third row. The row of seating 14 includes a split bench vehicle seating assembly 20 which provides approximately two-thirds of the row of seating 14 in this example. An additional seat assembly 22 is located next to or adjacent to the split bench vehicle seating assembly 20 to complete the approximate one-third of the row of seating 14 in the example shown. The vehicle 10 includes passenger doors 18 which allow access to the cabin interior and the seating. Further, the vehicle 10 has a floor 16 upon which the seating assemblies are supported.

The split bench vehicle seating assembly 20 is further illustrated in FIGS. 2-5 having a plurality of seat mounts 38 on the bottom thereof which may be supported or fastened onto the floor 16 of the vehicle 10. The split bench vehicle seating assembly 20 includes a seat frame 25 supporting a seat base 24 and a split seatback 26 which includes a first seatback 28 and a second seatback 30. The second seatback 30 may pivot between upright and folded positions independent of the first seatback or may pivot in sync with the first seatback 28. The split seatback 26 may pivot between an upright position shown in FIG. 2 which provides back support for one or two seated passengers. The split seatback 26 pivots about a first pivot mechanism 32 so as to pivot relative to the seat base 24. The first pivot mechanism 32 allows the first and second seatbacks 28 and 30 to pivot together between the upright and folded positions. In the embodiment shown, the first pivot mechanism 32 includes a first transmission or pivot rod 50 generally extending a width of the split seatback 26 and having connectors on each end.

In the embodiment shown, an actuator 56, such as an electric motor is coupled to first pivot mechanism 32 for actuating the split seatback 26 between the upright and folded positions. The actuator 56 may secure the split seatback 26 in any position throughout a range of positions between the upright and folded positions. The actuator 56 may be activated in response to a user input such as an input switch to actuate the seatback towards the upright position or the folded position. It should be appreciated that the first pivot mechanism 32 may include other actuators or may include a manually adjustable or releasable pivot mechanism that allows the split seatback 26 to fold from the upright position to the folded position.

The second seatback 30 may pivot independently of the first seatback 28 from the upright position which extends somewhat vertically to a folded down position which is generally horizontal to allow for one or more items to extend through the space provided above the folded seatback and to be supported on the back side of the second seatback 30. The split back seating assembly 20 includes a second pivot mechanism 34 coupled to the second seatback 30 and comprising a pair of locking pivot mechanisms proximate to the ends thereof for releasably holding the second seatback 30 in the upright position. A second mechanism for releasing the pair of locking pivot mechanisms is provided in the form of a pull strap 36 extending upward from the top of the second seatback 30, according to one example. The pull strap 36 may be manually pulled with force to release the pair of locking pivot mechanisms 80 to allow the second seatback 30 to be released and spring biased forward with a dump spring 76 to the folded position. It should be appreciated that the second mechanism for releasing the pair of locking pivot mechanisms may otherwise be configured as a lever, a cable, a push-button release or other release mechanism, according to other embodiments. A user may apply upward force to the upper front side of the second seatback 30 to tilt the second seatback 30 back to the upright position and into locking reengagement with the pair of locking pivot mechanisms to releasably re-secure the second seatback 30 in the upright position.

Figure 2:
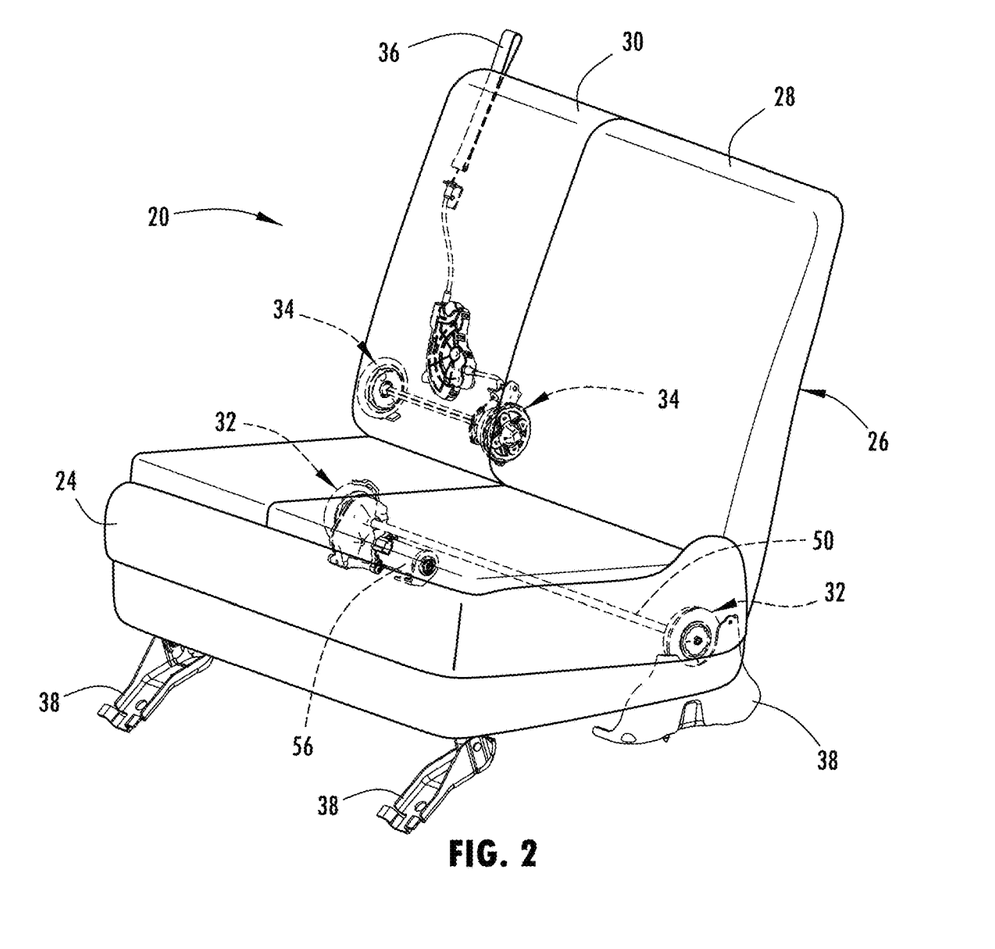
FIG. 2 is a perspective view of the vehicle seating assembly having a split seatback, according to one example.
Figure 3:
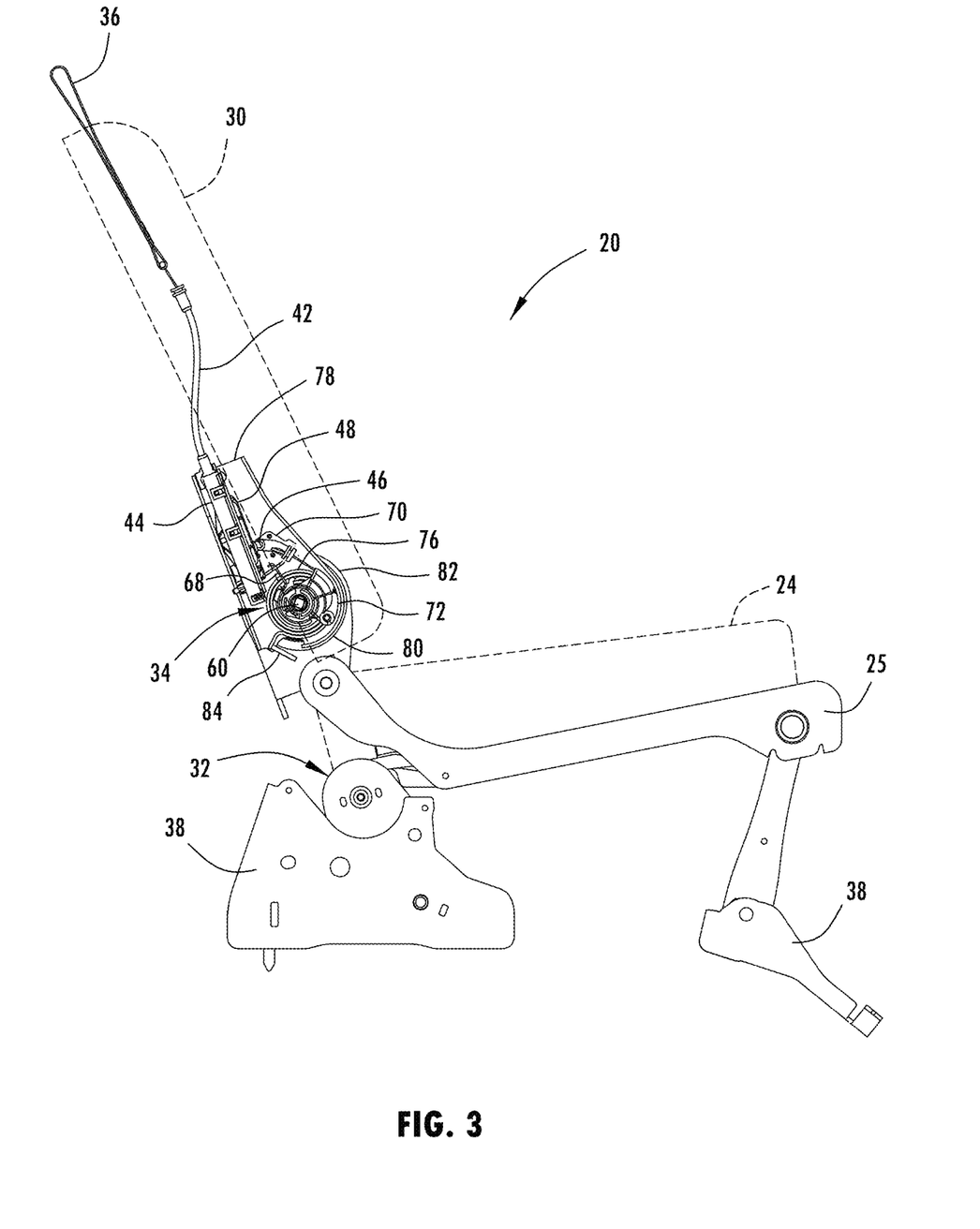
FIG. 3 is a side view of the vehicle seating assembly shown in FIG. 2 with the split seatback in the upright position.
Figure 4:
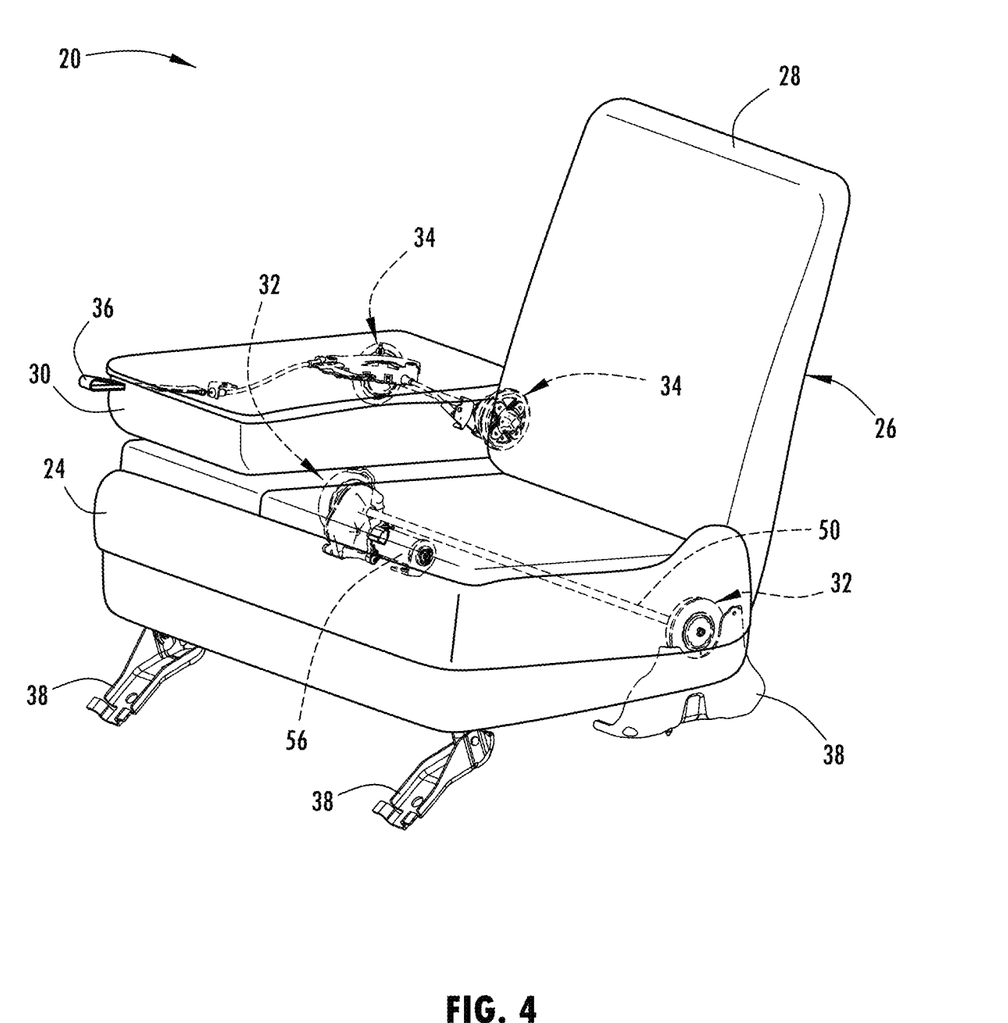
FIG. 4 is a perspective view of the vehicle seating assembly showing a flip down seatback in a folded position.
Figure 5:
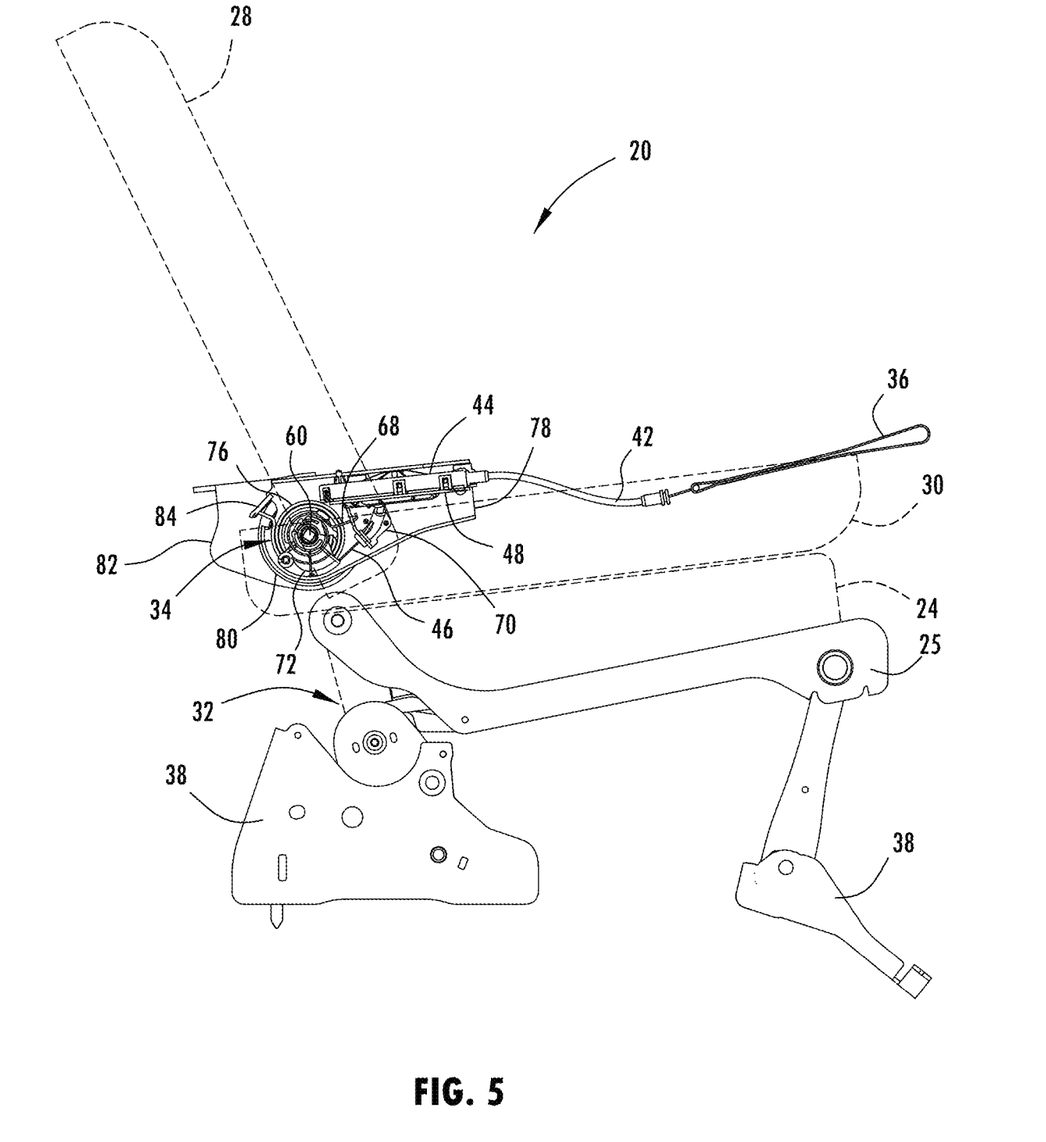
FIG. 5 is a side view of the vehicle seating assembly showing the split seatback in the folded position.

The split bench vehicle seating assembly 20 is illustrated in FIGS. 2 and 3 with the split seatback 26 in the upright position to accommodate one or two seated passengers. In FIGS. 4 and 5, the second seatback 30 is shown in the forward folded position which allows one or more items to extend through the space above the folded second seatback 30 and be stored on top thereof such that the items may extend through the row of seating.

Figure 6:
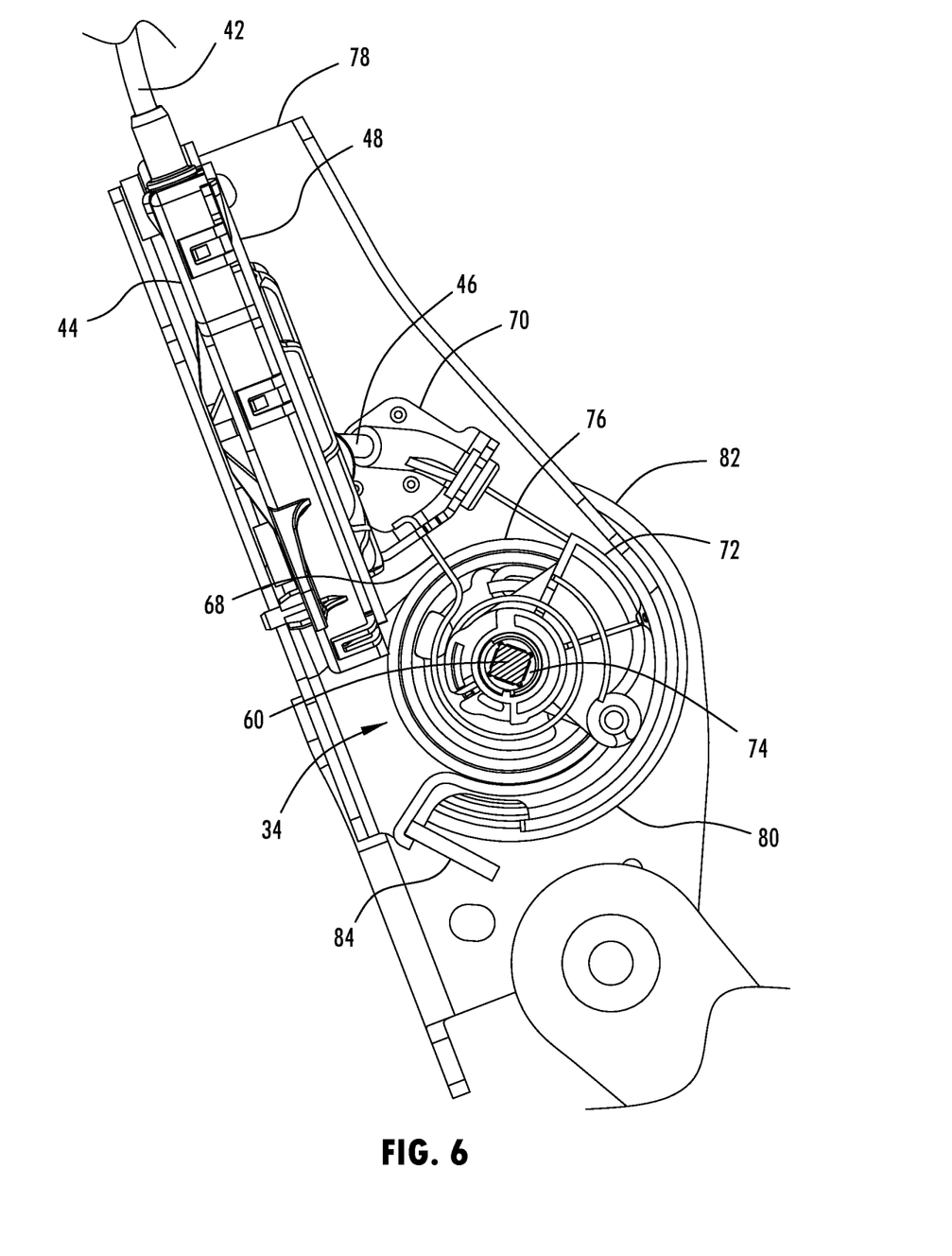
FIG. 6 is an enlarged side view of the flip down seatback having a pivot mechanism, according to one example.
Figure 7:
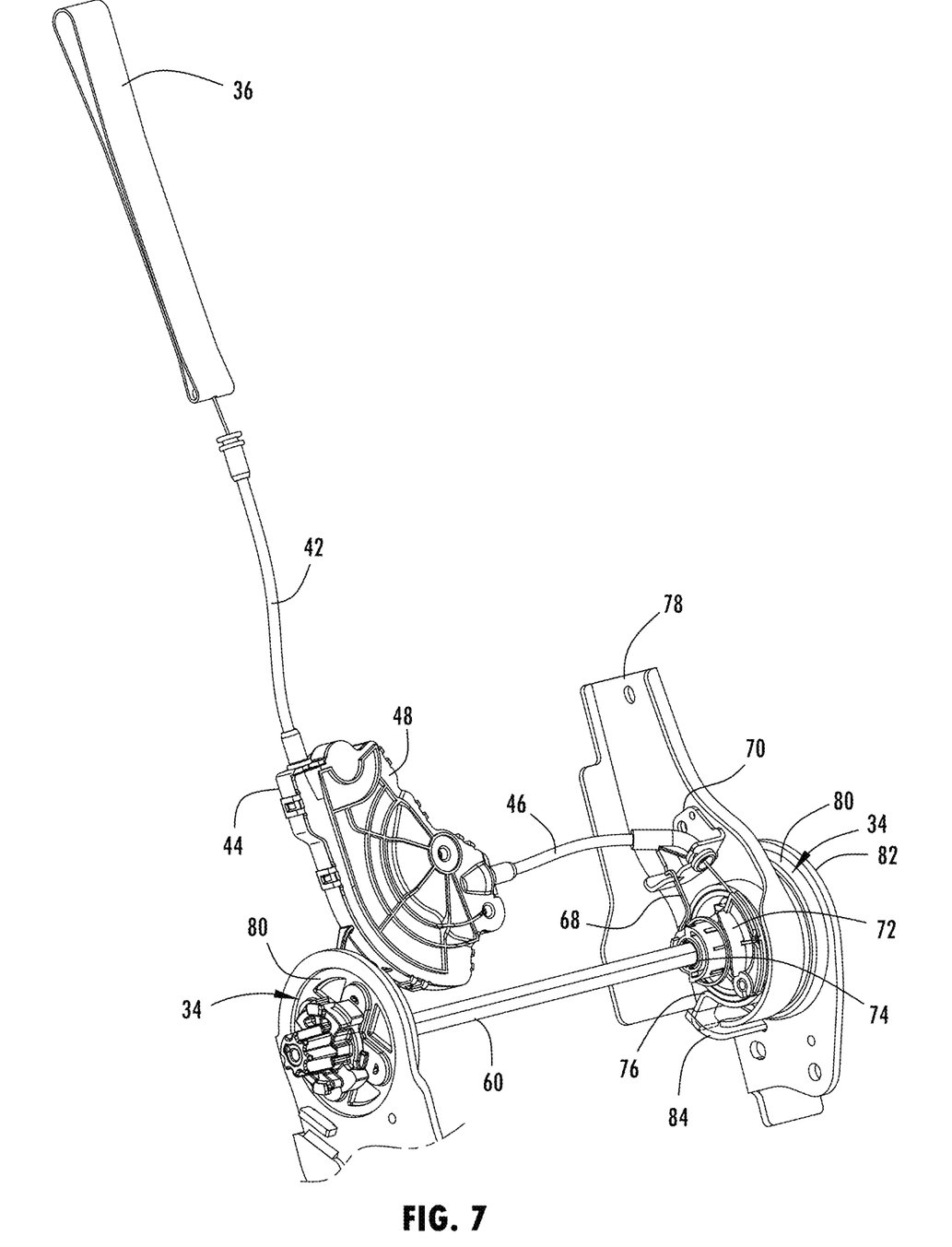
FIG. 7 is a perspective view of the pull handle and pivot mechanism for the flip down seatback.
Figure 8:
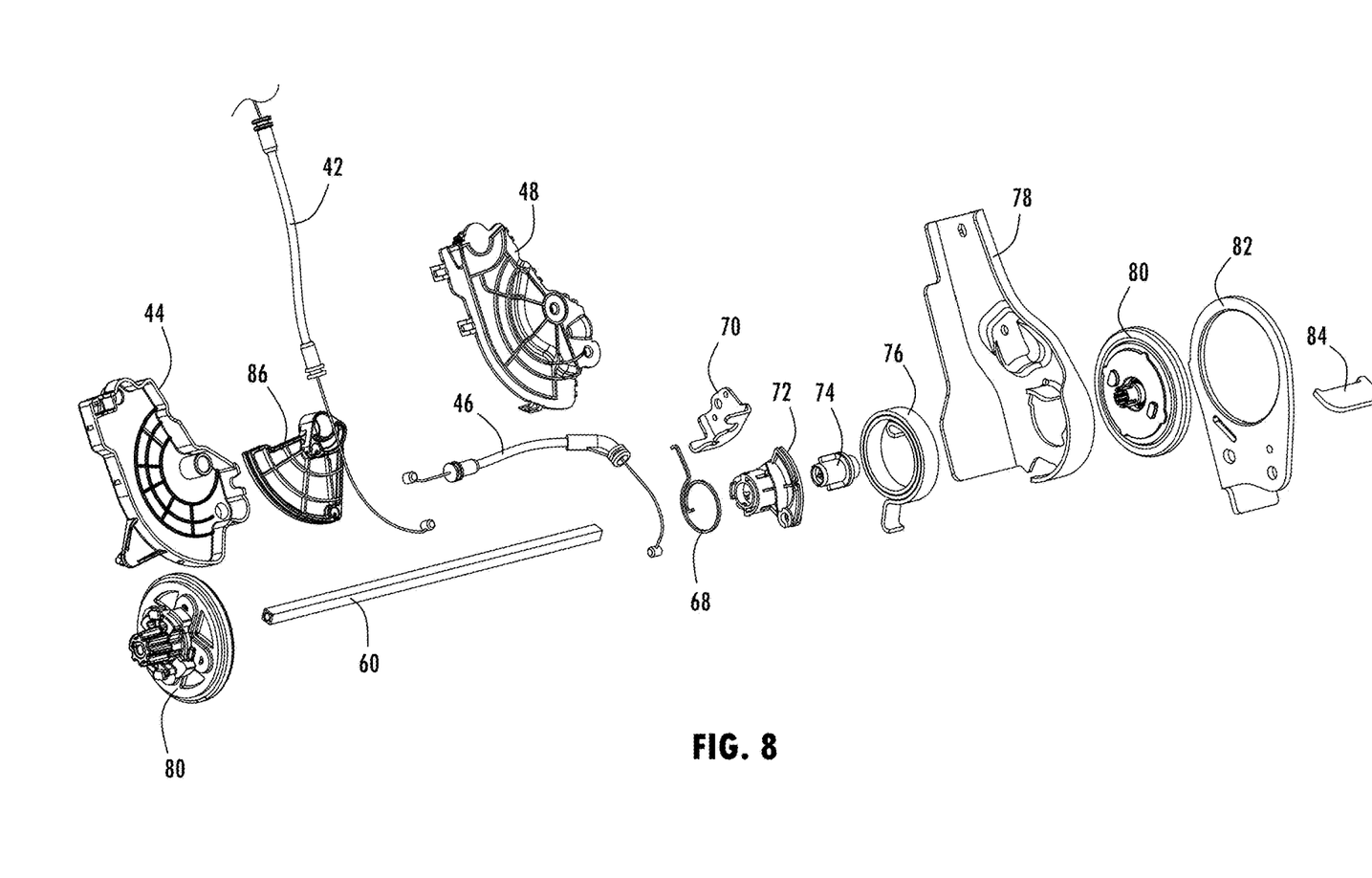
FIG. 8 is an exploded view of the pull handle and flip down seatback mechanism having a locking pivot arrangement, according to one example.

The second pivot mechanism 34 is illustrated in more detail in FIGS. 6-8 according to one example. The pull strap 36 which has a handle is coupled to a cable arrangement that includes a first cable 42 and a second cable 46 that upon a pull force actuation of the pull strap 36 rotates the second pivot rod 60 to release the pair of locking pivot mechanisms of the second mechanism to thereby release the second seatback 30. The cable arrangement may include one or more Bowden cables, according to one example. The first cable 42 is shown connected to a rotating connector 86 which is supported on housing members 44 and 48. The second cable 46 is shown connected to the rotating connector 86. The pivoting member 72 includes an insert 74 that engages the second pivot rod 60. A bias spring 68 biases the pivoting member 72 toward the engaged position of the locking pivot members and is supported on a bracket 70. It should be appreciated that locking pivot mechanisms 80 are provided on opposite ends of the second pivot rod 60 so as to releasably lock the second seatback in the upright position securely.

The second cable 46 when pulled under tension by the first cable 42 and pull strap 36 may rotate a pivoting member 72 which, in turn, engages the second transmission or pivot rod 60 to thereby rotate the second pivot rod 60. The rotation of the second pivot rod 60 causes the locking pivot mechanisms 80 on both ends of second pivot rod 60 to become unlocked to thereby allowing the second seatback 30 to pivot freely. A dump spring 76 is shown coupled to the seatback bracket 78 to provide a spring bias to bias the second seatback 30 towards the folded position. It should be appreciated that one or more dump springs may be employed on either or both ends of the second pivot rod 60. Accordingly, when the pair of locking pivot mechanisms 80 are unlocked, the dump spring 76 will bias force the second seatback 30 from the upright position forward to the folded position. The locking pivot mechanisms 80 may be attached to brackets such as bracket 82 with a connector 84. The locking pivot mechanisms 80 may each include a pair of locking pins that travel on a cam to move between an engaged locked position and a disengaged unlocked position.

Figure 9:
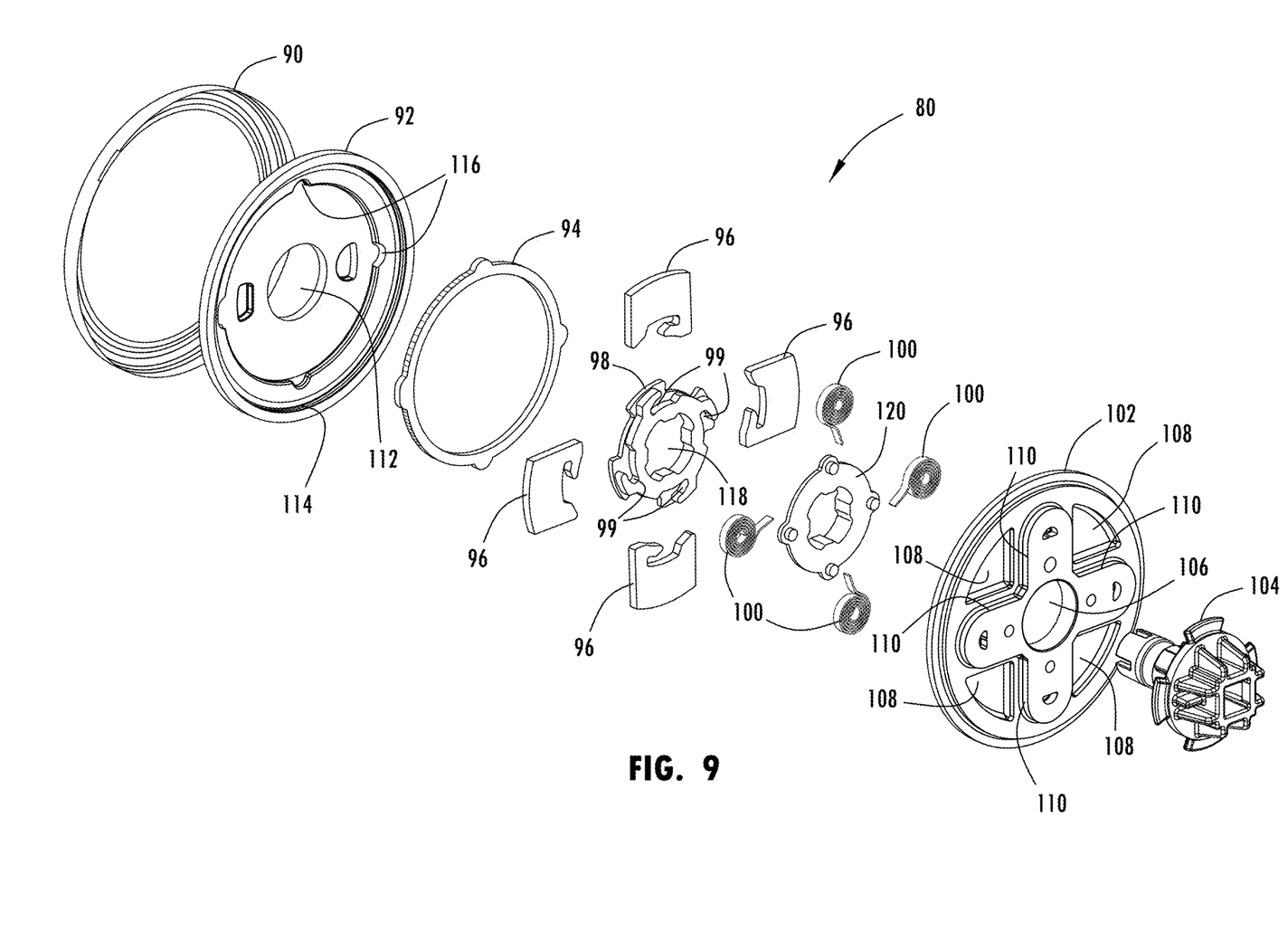
FIG. 9 is an exploded view of one example of the locking pivot mechanism shown in FIG. 8.

Referring to FIG. 9, one example of the locking pivot mechanism 80 is shown which may be mounted to brackets releasably coupled to the opposite ends of the pivot rod 60. The locking pivot mechanism 80 may include a guide plate 102, a ratchet plate 92, a cam 98, a plurality of pawls 96, a connector disk 120, a plurality of coil springs 100, a control ring 94 and an encapsulation ring 90. The locking pivot mechanism 80 may be operable to lock the second mechanism, thus preventing relative rotation between the second seatback 30 and the seat base 24 and also to unlock the second mechanism thus permitting relative rotation between the second seatback 30 and the seat base 24. The guide plate 102 may be mounted to the bracket 82. The guide plate 102 may be a generally round, flat disk with a central aperture 106, a plurality of bosses 108 and first recesses 110. The ratchet plate 92 may be a generally round, flat disk and may include a central aperture 112 and a cylindrical recess 114. The cylindrical recess 114 may include a plurality of teeth 116 disposed on an inner diameter defining the cylindrical recess 114. The seatback bracket 78 may be welded and/or otherwise suitably fixed to the second seatback 30 and the ratchet plate 92 to attach the ratchet plate 92 to the second seatback 30. The ratchet plate 92 may be mounted to the guide plate 102 with the cylindrical recess 114 disposed substantially concentric with outer radii of the bosses 108. The encapsulation ring 90 has a U-shaped cross section and may be disposed generally around the peripheries of the ratchet plate 92 and the guide plate 102 to rotatably couple the ratchet plate 92 to the guide plate 102. The plurality of pawls 96 may be radially disposed around the central aperture 106 on the guide plate 102 and may be slidably mounted within the first recesses 110 of the guide plate 102. An edge of each pawl 96 may include a plurality of teeth adapted for meshing engagement with the teeth 116 of ratchet plate 92. Each pawl 96 may also include a latch and an edge opposite the teeth.

The cam 98 may be a generally round disk having an aperture 118 and a plurality of radial latch protrusions 99 arranged around the aperture 118. The cam 98 is rotatable relative to the pawls 96 and the ratchet plate 92 such that the latch protrusions 99 can selectively engage the latches of the pawls 96 to move the pawls 96 out of engagement with the teeth of the ratchet plate 92 and therefore into the unlocked state. The connector disk 120 engages with the cam 98 and a hub 104. The connector disk 120 may include a disk portion and an extrusion that extends perpendicularly from the disk portion. The disk portion may have a plurality of flanges extending therefrom where each flange is engaged with a corresponding one of the coil springs 100. Each flange is engaged to the corresponding coil spring 100, so the connector disk 120 rotationally biases the cam 98 to cause the latch portions to force the pawls 96 radially outwardly into the lock state where the teeth of the pawls engage the ratchet plate.

It should be appreciated that the locking pivot mechanism 80 shown in FIG. 9 may be used for each of the pair of locking mechanisms that are located on opposite ends of the second pivot rod 60. As such, rotation of the second rod pivot 60 controls the unlocking of the locking pivot mechanisms on both ends.

Accordingly, the split bench vehicle seating assembly 20 advantageously provides for a split seatback with a first seatback and the second seatback that may pivot independently of the first seatback to allow for storage of items to pass through the folded portion vehicle seating assembly. The split bench vehicle seating assembly 20 advantageously provides a second seatback that is free of a striker or a latch which may otherwise protrude outward from the split bench vehicle seating assembly 20.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seating assembly comprising:
   a seat base;
   a split seatback having a seatback frame and pivotally coupled to the seat base, the split seatback having a first seatback and a second seatback;
   a first pivot mechanism coupled to the seatback frame for allowing the split seatback to pivot between an upright position and folded position;
   a first mechanism for moving the split seatback to the folded position;
   a second pivot mechanism coupled to the second seatback and comprising a pair of locking pivot mechanisms for releasably holding the second seatback in an upright position; and
   a second mechanism for releasing the pair of locking pivot mechanisms to allow the second seatback to move to a folded position, wherein the second seatback is free of a striker or latch.

2. A vehicle seating assembly comprising:
   a seat base;
   a split seatback having a seatback frame and pivotally coupled to the seat base, the split seatback having a first seatback and a second seatback;
   a first pivot mechanism coupled to the seatback frame for allowing the split seatback to pivot between an upright position and folded position;
   a first mechanism for moving the split seatback to the folded position;
   a second pivot mechanism coupled to the second seatback and comprising a pair of locking pivot mechanisms for releasably holding the second seatback in an upright position;
   a second mechanism for releasing the pair of locking pivot mechanisms to allow the second seatback to move to a folded position; and
   a first spring operatively coupled to the second pivot mechanism to spring bias the second seatback towards the folded position.

3. The vehicle seating assembly of claim 2, wherein the spring comprises a dump spring.

4. The vehicle seating assembly of claim 2, wherein the first mechanism comprises a motor actuatable to move split seatback toward the folded position.

5. The vehicle seating assembly of claim 2, wherein the second mechanism comprises a release mechanism.

6. The vehicle seating assembly of claim 5, wherein the release mechanism comprises a pull strap.

7. The vehicle seating assembly of claim 6, wherein the pull strap is located proximate an upper side of the second seatback.

8. The vehicle seating assembly of claim 2, wherein the vehicle seating assembly comprises a rear seating assembly.

9. The vehicle seating assembly of claim 2, wherein the second pivot mechanism comprising a pivot rod extending laterally across the second seatback.

10. The vehicle seating assembly of claim 9, wherein the pair of locking pivot mechanisms are located proximate opposite ends of the pivot rod.

11. A vehicle seating assembly comprising:
    a seat base;
    a split seatback having a seatback frame and pivotally coupled to the seat base, the split seatback having a first seatback and a second seatback;
    a first pivot mechanism coupled to the seatback frame allowing the split seatback to pivot between an upright position and a folded position;
    a motor for moving the split seatback to pivot to the folded position;
    a second pivot mechanism comprising a pair of locking pivot mechanisms coupled to the second seatback for releasably holding the second seatback in an upright position;
    a dump spring operatively coupled to the second seatback to spring bias the second seatback towards the folded position; and
    a second mechanism comprising a pull mechanism for releasing the second pair of pivot mechanisms to allow the second seatback to move to a folded position with the dump spring.

12. The vehicle seating assembly of claim 11, wherein the vehicle seating assembly comprises a rear seating assembly.

13. The vehicle seating assembly of claim 11, wherein the second pivot mechanism comprising a pivot rod extending laterally across the second seatback.

14. The vehicle seating assembly of claim 13, wherein the pair of locking pivot mechanisms are located proximate opposite ends of the pivot rod.

15. The vehicle seating assembly of claim 11, wherein the first mechanism comprises a motor actuatable to move the split seatback toward the folded position.

16. The vehicle seating assembly of claim 11, wherein the release mechanism comprises a first pull strap.

17. The vehicle seating assembly of claim 16, wherein the pull strap is located proximate an upper side of the second seatback.

18. The vehicle seating assembly of claim 11, wherein the second seatback is free of a striker or latch.

\* \* \* \* \*

UNITED STATES PATENT AND TRADEMARK OFFICE
CERTIFICATE OF CORRECTION

PATENT NO. : 11,970,096 B2
APPLICATION NO. : 17/572756
DATED : April 30, 2024
INVENTOR(S) : Sahi et al.

It is certified that error appears in the above-identified patent and that said Letters Patent is hereby corrected as shown below:

In the Claims

Column 7:
Claim 3, Line 56;
"2" should be --1--.

Column 8:
Claim 4, Line 1;
"2" should be --1--.
Claim 5, Line 4;
"2" should be --1--.
Claim 8, Line 11;
"2" should be --1--.
Claim 9, Line 13;
"2" should be --1--.

Signed and Sealed this
Eleventh Day of June, 2024

Katherine Kelly Vidal
*Director of the United States Patent and Trademark Office*